United States Patent [19]

Hinsche et al.

[11] 4,016,240
[45] Apr. 5, 1977

[54] PRODUCTION OF SYNTHETIC ANHYDRITE

[75] Inventors: Friedrich Hinsche, Leverkusen; Kurt Schaupp, Cologne, both of Germany

[73] Assignee: Bayer Aktiengesellschaft, Leverkusen, Germany

[22] Filed: May 22, 1974

[21] Appl. No.: 472,382

[30] Foreign Application Priority Data

June 16, 1973 Germany .......................... 2330728

[52] U.S. Cl. ........................... 423/170; 106/109; 423/555
[51] Int. Cl.² ................................... C04B 11/06
[58] Field of Search .......... 423/484, 485, 554, 555, 423/170, 171, 172; 106/109

[56] References Cited

UNITED STATES PATENTS

| 1,713,868 | 5/1929 | Edwards | 423/170 |
| 1,756,637 | 4/1930 | Edwards | 423/170 |
| 2,959,466 | 11/1960 | Reimers | 423/555 |
| 3,024,123 | 3/1962 | Theilacker | 106/109 |
| 3,822,340 | 7/1974 | Eberl et al. | 423/555 |
| 3,825,655 | 7/1974 | Eipeltauer | 423/485 |
| 3,834,917 | 9/1974 | Speckelmeyer et al. | 423/555 |
| 3,847,634 | 11/1974 | Vickery | 106/109 |

FOREIGN PATENTS OR APPLICATIONS 30,065 12/1968 Japan .............................. 106/109

*Primary Examiner*—Oscar R. Vertiz
*Assistant Examiner*—Gary P. Straub
*Attorney, Agent, or Firm*—Burgess, Dinklage & Sprung

[57] ABSTRACT

The process for the production of synthetic anhydrite of uniform quality from the residue resulting from the production of hydrofluoric acid and containing calcium sulfate and acid, comprising suspending said residue in water with vigorous agitation, neutralizing said residue, grinding the suspension and separating water from the suspension to leave synthetic anhydrite containing less than about 50% water by weight. The product is thereafter dried after the optional addition of fillers and/or additives which accelerate subsequent hydration.

10 Claims, 1 Drawing Figure

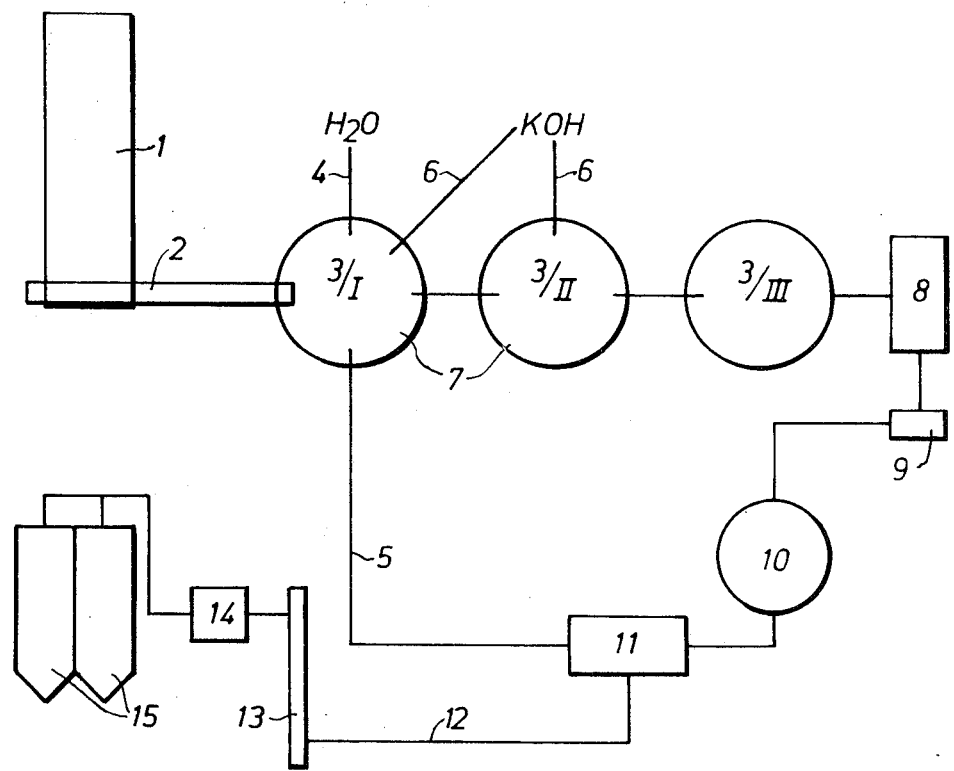

PRODUCTION OF SYNTHETIC ANHYDRITE

This invention relates to the production of a synthetic anhydrite of uniform quality having special properties by suspending in water the dry crude anhydrite obtained from the production of hydrofluoric acid, neutralizing the suspension and grinding it in the wet phase, separating the aqueous portion and then drying.

The production of hydrofluoric acid results in a by-product which consists mainly of anhydrous calcium sulfate and contains, in addition to minor quantities, generally from 1 to 3% by weight, of unreacted calcium fluoride, other impurities such as iron oxide, aluminum oxide and their sulfates and sometimes barium sulfate, depending on the origin and degree of purity of the fluoride used in the process. In addition, there are varying quantities of sulfuric acid, hydrofluoric acid and fluorosulfonic acid, depending on the method of production and operation conditions. The spectrum of particle sizes of this material ranges from particles as fine as dust to granules having a diameter of 10 cm. The structure of the particles also depends on the method of production and on the chemical composition of the crude anhydrite.

In known processes, the crude anhydrite is generally neutralized with lime (CaO, Ca[OH]$_2$ or CaCO$_3$) and then finely ground. In order to prevent the possibility of an acid reaction in the end product resulting from insufficient neutralization, the neutralizing agent is always added in an excess of from 0.3 to 2%. This excess of alkaline reagent is partly regarded as the activator, i.e. as the hydration accelerator for the anhydrite.

The properties of the synthetic anhydrite produced in this way may vary considerably depending on the conditions under which it is produced. This is easily understood if one considers the often great variations in the operating conditions of individual processes, e.g. the pretreatment of the fluor-spar, the nature of the sulfuric acid used, the method of mixing the fluor-spar and acid, the temperature control, dwell time of the material in the furnace and discharge temperature of the crude anhydrite. Variations in the quality of the anhydrite may even be caused by minor variations in the operating conditions of the process used. Thus, for example, the temperature of the crude anhydrite on leaving the furnace may vary between 130° and 300° C depending on the operating conditions while the residual acid content may vary between 0.2 and 10%. On the other hand, the temperature at which neutralization is carried out depends on the temperature of the crude anhydrite, the residual acid content, the nature and quantity of the neutralizing agent used and the cooling facilities before and during neutralization (e.g. by using different types of mills). The differences in the operating conditions will cause variations in the properties of the synthetic anhydrite obtained as the end product. Among these variations, substantial fluctuations in the ease with which the product can be worked up and in the solidification characteristics and development of strength have repeatedly been mentioned as particularly disadvantageous.

Synthetic anhydrite is used mainly as a binder in the building industry. Good quality and in particular a uniform quality is therefore necessary. There have therefore been many attempts to provide improvements in the process for producing anhydrite. For example, in German Patent Specification No. 1,017,518 it is recommended to keep the neutralization temperature at or above 150° C in order to obtain a smooth synthetic anhydrite which is particularly easy to work with.

In none of the known processes, however, is it possible to obtain a substantially uniform product, i.e. one which is uniform and constant in its appearance, the flow properties or pouring qualities of the dry anhydrite powder, the bulk weight and the plasticity and consistency for working up when a given quantity of water is added (constant water/binder factor = WBF), solidification and setting times, development of the physical properties on solidification, and shrinkage and swelling properties.

It has now been found that a synthetic anhydrite with the desired properties is obtained if the crude acid containing anhydrite is suspended in water after leaving the furnace, optionally neutralized by the addition of the necessary quantity of neutralizing agent and/or by washing it with water, and is then divided into fine particles by grinding it, vigorously stirring it or employing other suitable measures in the wet phase, and excess aqueous phase is then removed mechanically on filters, in centrifuges, in hydrocyclones or the like, and the product is then dried if desired, at which stage the properties of the end product can be varied to a certain extent by suitable choice of the temperature. The drying temperatures employed are normally between about 50° C and 600° C and are preferably between about 100° C and 250° C.

The surprising and unforeseeable result of such a suspension treatment is that the anhydritic character of the calcium sulfate is preserved, even if the anhydrite is left in the aqueous phase for several hours and even at temperatures below 40° C. The products obtained are uniform in their properties which are practically independent of the method of production employed and the prevailing operating conditions. This applies even if activators acting as hydration accelerators are added to the anhydrite before or during the wet treatment. The substances used as activators may be potassium sulfate, sodium sulfate and in special cases double salts of these products or mixtures thereof.

In addition, the method according to the invention provides numerous advantages from a technical viewpoint:

Neutralization in the wet phase can be carried out not only by adding dry pulverized substances but in a technically much simpler manner by adding an aqueous dispersion, suspension or solution of products which are alkaline in reaction. Thus for example the wet phase can easily be neutralized with potassium hydroxide solution which not only achieves the required neutralization in a simpler manner but also results in the formation of potassium sulfate as a product of the neutralization with sulfuric acid, this neutralization product being required later as the hydration accelerator.

Grinding is particularly easy to carry out on the suspended anhydrite since the anhydrite spontaneously disintegrates into very fine particles in water or can easily be made to do so simply by vigorous stirring or at least it is softened to such an extent by the water that only a minimum grinding effort is required.

Since the anhydrite is preferably suspended in a solution which is alkaline, the acid waste gases which are produced in the dry process both in transport and particularly in the neutralization and grinding stages and which cause severe corrosion in the parts of the apparatus made of iron as well as requiring considerable measures of environmental protection simply do not occur. If the water used for suspending the anhydrite is circulated, optionally with the addition of lime and activator, then no contaminated effluent is formed in the process. In addition, the portions of activators and neutralizing agents remaining in the water are not lost.

It is no longer necessary to observe the time for ripening of several days which is generally regarded as being necessary in the dry process. This is because in the wet process neutralization is completed within a few minutes, even if only suspended neutralizing agents are used whereas in the dry process neutralization requires several days due to the fact that the acid enclosed in the crystal agglomerates must first diffuse to the surface before it can be neutralized.

If the material is in the form of a suspension, it can easily be pumped through pipes, even over long distances, without any risk of blockages in the pumps or conduits caused by the deposition of the solids content.

Furthermore, the process according to the invention enables shaped products, for example building elements or granules for the cement industry to be directly produced without a great expenditure. For this purpose, the binder paste which has been separated from excess water is worked up either directly or after the addition of suitable additives and aggregates (optionally after the additional introduction of activators, using 1% of $K_2SO_4$ based on the anhydrite).

The following additives may be used:

a. Plaster of Paris. By adding the necessary quantity of water, a pourable binder dross can be obtained which rapidly stiffens and which can be removed from its form within a short time. In such mixture the synthetic anhydrite may comprise about 5 to 65% and preferably about 45 to 60% by weight, the Plaster of Paris about 55 down to 5% and preferably about 20 down to 10%, and water about 40 down to 30% and preferably about 35 down to 30%.

b. Anhydrite in the dry form, either as the end product from the process itself or, for economical reasons, preferably the fine portion obtained by separation (e.g. by sifting) from the crude product before it is suspended. The compositions which are capable of setting can be adjusted to various degrees of fluidity or plasticity according to the selected ratio of wet to dry product. Thus for example partition panels can be produced by casting, flooring tiles can be produced by pressing and transport-resistant and weather-resistant granules for the cement industry can be produced by granulating. When producing granules for the cement industry, the $CaSO_4 \cdot 2H_2O$ content in the set granulate, which is particularly important for controlling the setting of Portland cements, may be increased above the proportion of dihydrate which naturally results from the hydration of the anhydrite by adding industrial gypsum ($CaSO_4 \cdot 2H_2O$) in a dry or moist form. The ratio of dihydrate to anhydrite in the granulate can easily be regulated in this way.

c. Aggregates such as sand, fine gravel, pumice, expanded clay and perlite, which are preferably mixed homogeneously with the moist anhydrite mass in a forced circulation mixer and can be worked up in this form into shaped elements. In such mixture the aggregate may comprise about 10 to 400% and preferably about 30 to 150% by weight of the synthetic anhydrite.

The process according to the invention, however, is distinguished not only by these technical improvements but primarily, as already mentioned above, by the production of a synthetic anhydrite which has particularly advantageous properties, namely:

The anhydrite material can be easily transported pneumatically. It can be transported in silo carriages without difficulty and from there it can be emptied into silos and stored.

The flow properties of the material when made up into a paste with water are particularly advantageous. A paste of this kind is highly plastic even if the WBF is low and it has only a small tendency to internal cohesion.

The short solidification and hardening times which are required for rapid removal from the shell in the production of building elements from a pourable paste of the binder and hence for ensuring a rapid production process are obtained, especially if calcium sulfate semihydrate is added. Separation of the constituents of this relatively thin binder paste due to sedimentation of the solid content does not occur.

Since exact neutralization can easily be carried out in the wet phase it is possible to obtain a neutral product which is suitable for special purposes. This is particularly important in cases where additives which are sensitive to acids or alkalis are to be employed. For example, silica sol used in a quantity of 0.5% or more has a liquefying action on anhydrite only if the anhydrite is neutral in reaction and does not contain any additional electrolytes.

The process according to the invention improves the solidification characteristics of the synthetic anhydrite, for example, the plasticity or viscosity of a mortar prepared from such an anhydrite will remain practically unchanged during the first 20 minutes and only then will it begin slowly to stiffen, a change which will result in the gradual solidification of the mass. In contrast, in the case of conventionally produced anhydrite the mortar often undergoes an increase in viscosity or loss of plasticity only a few minutes after the addition of water under the same conditions, so that the working properties of such a mortar are seriously impaired.

The dried product has an exceptionally light color and therefore for optical reasons alone it is particularly suitable for certain purposes, for example, for plastering.

In detail, the process according to the invention is carried out as follows:

The calcium sulfate-containing residue from a hydrofluoric acid furnace drops into a conveyor device, for example a packing screw, which conveys the material either directly or by way of other conveyor installations to a suspension tank which already contains water and/or to which water is supplied at the same time. The hot furnace waste is preferably introduced into this tank without additional cooling, i.e. at the discharge temperatures of about 140° to 260° C. The suspension is substantially homogenized by vigorous agitation, for example by stirring. If the coarser portions of the calcium sulfate-containing waste are not completely broken down and suspended by this operation a subsequent wet grinding operation may be carried out. The ratio of water to solids selected for this purpose has a lower limit due to the fact that it may be subsequently necessary to pump the suspension and has an upper limit governed by economical considerations. The ratio is generally within the limits of from 0.25 to 20 and preferably about 1 to 8.

The suspension is adjusted to neutral, i.e. to a final pH of between 6.5 and 7.5. The cheapest neutralizing agents may be used for this purpose, such as $Ca(OH)_2$ or CaO or even calcium carbonate. If substances such as potassium hydroxide are used in whole or in part instead of these inexpensive neutralizing agents, then the following advantages are obtained: firstly, such a liquid can be accurately measured more easily and secondly the neutralization reaction with sulfuric acid results in the formation or potassium sulfate which is homogeneously incorporated in the calcium sulfate as the activator for the subsequent setting reaction. The amount of activator should be about 0.1 to 5% by weight, preferably about 0.3 to 1.5% by weight, based on the dry anhydrite. It is not necessary for a separate addition of activator when the binder is subsequently worked up with water. Neutralization of the calcium sulfate-containing dispersion may also be carried out by decanting the dispersion once or several times and adding more water. This method is particularly suitable if the acid content is low. The operations of suspension, neutralization and homogenization may also be carried out in several stages. For example, using several suspension tanks arranged in series, a rough preliminary neutralization may first be carried out, followed by the exact adjustment of the pH (see FIGURE and descriptions of a preferred embodiment).

In the next stage of the process, the calcium sulfate is separated from the aqueous phase of the resulting suspension. This may be carried out in filters, centrifuges, decanters, hydrocyclones or similar apparatus. The filtrate obtained can be used again for suspending fresh furnace waste. The solid content obtained still has a moisture content of about 10 to 50% by weight, preferably about 20 to 35% by weight. It is then dried in a second dehydration stage at a temperature of about 50° to 600° C, preferably about 100° to 250° C. Any type of drying oven may be used, but the substance is preferably dried in a stream of gas. The residence time in the wet phase is between about 10 minutes and 24 hours and preferably between about 1 and 3 hours. The material leaving the drier still has a residual moisture content of about 0.2 to 2%, preferably about 0.3 to 0.8%. On leaving the drier, the product which is now finished is conveyed to a silo plant, optionally by way of a cooler.

According to a special embodiment of the process, the moist anhydrite obtained from the first dehydration stage is removed and converted by the addition of dry anhydrite, Plaster of Paris, industrial gypsum and optionally aggregates such as sand, gravel, pumice, expanded clay or perlite into compositions which can be molded and set, which compositions are then worked up into products by casting, pressing, granulating or briquetting. In cases where dry anhydrite is added, this is preferably obtained in the form of the fine portion of the calcium sulfate-containing residue of hydrofluoric acid production by separating of this fine portion before the remainder of the residue is suspended. This fine material is generally less than about 1.0 mm and preferably less than about 0.1 mm in size and may range from about 15 to 40% by using less than 1.0 mm in size and from about 5 to 15% (by weight) of the residue by using less than 0.1 mm in size. It is added to the moist synthetic anhydrite in such amount that the water content of the mixture ranges from about 5 to 30%, preferably about 8 to 15%, by weight. According to a particularly preferred embodiment there is then added about 20 to 70%, preferably about 40 to 50%, of $CaSO_4.2H_2O$ based on the weight of the resulting mixture from anhydrite and $CaSO_4.2H_2O$, the mixture then being permitted to set. The product obtained in this way contains, when set, about 50 to 90% and preferably about 60 to 70% of $CaSO_4.2H_2O$ and is particularly suitable for use as the setting regulator for the manufacture of Portland cements.

One of the preferred embodiments of the process will now be described with reference to the accompanying drawing wherein the FIGURE is a schematic flow sheet of an apparatus for carrying out the process.

Referring now more particularly to the drawing, there is shown a hydrofluoric acid furnace 1 from which residue, containing calcium sulfate and acid, is conveyed away by packing screw 2. The residue serially progresses through mixing tanks 3/I, 3/II, 3/III, to the first of which fresh water is supplied at 4. A filtrate, the source described more fully hereinbelow, is added at 5. A neutralizing agent, such as KOH is supplied at 6, the amount being regulated by pH monitoring devices 7.

The mixture of liquid and solid is milled at 8 and pumped at 9 to an elevated tank 10 from which it feeds by gravity to a separator 11, such as a filter or centrifuge, wherein most of the liquid is removed. Separated liquid is recycled at 5 and moist calcium sulfate is conveyed by screw 12 to a flow drier 13, after which it is allowed to cool at 14 and is stored in silos 15.

The process according to the invention will now be explained in more detail in the following examples using two samples of anhydrite prepared by different methods but from the same fluorite.

| A) | Discharge temperature of furnace waste | 165° C |
|---|---|---|
| | Acid content (based on $H_2SO_4$) | 6.3% |
| | Particle size distribution: below 50 μ | 28% |
| | 50 μ – 0.5 mm | 39% |
| | 0.5 – 5 mm | 22% |
| | above 5 mm | 11% |

| B) | Discharge temperature of furnace waste | 248° C |
|---|---|---|
| | Acid content (based on $H_2SO_4$) | 0.6% |
| | Distribution of particle sizes | |
| | below 50 μ | 56% |
| | 50 μ –0.5 mm | 18% |
| | 0.5 – 5 mm | 19% |
| | above 5 mm | 7% |

These two different waste products were then worked up by two different methods. In the first case (dry) sufficient CaO was added to a part of these materials in the hot state to provide an excess over the quantity of acid present of 0.9% by weight of CaO. The material was then ground in a pin mill. The ground end products had the following particle sizes:

| | >0.5 mm | >0.09 mm |
|---|---|---|
| $A_D$ | 0% | 1.8% |
| $B_D$ | 1.1% | 9.4% |

Whereas $B_D$ already had a pH of about 10 when wetted with water only 6 hours after neutralization and grinding, the pH of product $A_D$ was still 4 after 3 days and only 9 after 5 days.

In a parallel experiment, another portion of calcium sulfate-containing waste product was suspended in each case in water which contained the necessary quantity of CaO for neutralization (with 0.9% excess). A ratio of waste product to water of 1:8 was employed. Whereas material $A_W$ could be completely broken down into its finest particles simply by means of a high speed stirrer, material $B_W$ required the use of a wet ball mill although the amount of energy required was only one third of that required for dry grinding. The water was then separated by means of a filter. The filter cake was found to have a residual water content of 28% which comprises 27.1% of water adhering to the surface and only 0.9% of chemically bound water. The material was then dried in a fluidized bed drier at a temperature of from 150° to 170° C. The dried end products had the following particle sizes:

|  | >0.5 mm | >0.09 mm |
|---|---|---|
| $A_W$ | — | 1.2% |
| $B_W$ | — | 1.7% |

The residual water content was 0.3% in both products.

The properties of the products obtained by the wet process and the dry process are shown in the following table in which the symbols have the following meanings:

$A_D$ = Anhydrite A obtained by dry process
$A_W$ = Anhydrite A obtained by wet process
$B_D$ = Anhydrite B obtained by dry process
$B_W$ = Anhydrite B obtained by wet process.

The figures in the following table show, above all, the substantial agreement in the figures of different products obtained by the wet process in contrast to the considerable differences in the corresponding values obtained for different products produced by the dry process.

could be found for anhydrites produced by the dry process and the wet process because samples $A_D$ and $B_D$ were capable of giving rise to a highly fluid dross capable of solidifying quickly and not separating only if they contained a very high proportion of gypsum.

The following formulations were therefore employed (in Parts of weight):

|  |  |  |
|---|---|---|
| synthetic anhydrite $A_D$ or $B_D$ | 100 | — |
| synthetic anhydrite $A_W$ or $B_W$ | — | 100 |
| Plaster of Paris | 50 | 20 |
| Retarder for plaster | 0.05 | 0.02 |
| $K_2SO_4$ as activator for synthetic anhydrite | 1.0 | 1.0 |
| Water | 90 | 55 |

The following results were obtained:

| Formulation containing synthetic anhydrite of the following origin | Pouring time (in minutes) | Encasing time (in minutes) | Mechanical strength after | | |
|---|---|---|---|---|---|
| | | | 24 hours bending stress/pressure in kp/cm² | 3 days bending stress/pressure in kp/cm² | 7 days bending stress/pressure in kp/cm² |
| $A_D$ | 5 | 13 | 3.0/6.1 | 4.2/15 | 9.2/19 |
| $A_W$ | 4 | 12 | 4.5/12.4 | 18.5/62 | 49.6/127 |
| $B_D$ | 8 | 24 | 4.3/9.6 | 8.4/22 | 14.1/32 |
| $B_W$ | 5 | 14 | 5.2/15 | 21.0/75 | 48.0/135 |

In addition to the substantial improvement in mechanical properties of the samples which had been prepared from synthetic anhydrite by the wet process, the high degree of uniformity of the other properties is again very apparent.

Investigation of the fluidity of the various anhydrites or their suitability for pneumatic transport shows further interesting results:

| Product | Pouring agent | Bulk weight (kg/cm³) |
|---|---|---|
| $A_D$ | 61° | 0.85 |
| $A_W$ | 52° | 0.90 |
| $B_D$ | 25° | 0.96 |
| $B_W$ | 21° | 0.97 |

The suitability for pneumatic transport of the dry binder was investigated as follows: A double floor consisting of a lower solid plate and an upper air-permeable plate is installed at the lower end of a vertical tube 400 mm in diameter and 1000 mm in height. The distance between the two plates is 80 mm. The plates are connected at the center by means of an open-ended tube 55 mm in diameter which is flush with the plate at the top and projects downwards by 80 mm. An air conduit 28 mm in diameter extends into the chamber

|  | WBF | Flattening test cm | Setting time (min) | | Strength (kp/cm²) after | | | | | |
|---|---|---|---|---|---|---|---|---|---|---|
|  |  |  | beginning | end | 3 days bending stress | 3 days pressure | 7 days bending stress | 7 days pressure | 28 days bending stress | 28 days pressure |
| $A_D$ | 0.43 | 14.9 | 48 | 180 | 17.9 | 128 | 54.7 | 268 | 65.4 | 301 |
| $A_W$ | 0.40 | 14.8 | 56 | 210 | 25.3 | 168 | 51.0 | 231 | 57.4 | 264 |
| $B_D$ | 0.39 | 15.1 | 38 | 260 | 31.2 | 208 | 59.0 | 278 | 58.3 | 268 |
| $B_W$ | 0.41 | 15.3 | 51 | 218 | 23.7 | 159 | 49.8 | 226 | 59.7 | 284 |

The tests were carried out on samples which had been prepared according to DIN 4208 from 1 part by weight of synthetic anhydrite and 3 parts by weight of standard sand. 1 % of $K_2SO_4$ being added as activator to the anhydrite. The mechanical strength data were determined on prisms measuring 4 × 4 × 16 cm (according to DIN 4208 DIN 1164), after storage under standard atmospheric conditions.

When the pouring characteristics for producing building elements were tested, no uniform formulation which is formed by the two plates and the wall of the tube.

40 kg of anhydrite are poured into the tube from above while the small outlet tube (80 mm) is closed at the bottom. Air is now introduced into the chamber at a slight excess pressure, flowing through the permeable plate and the anhydrite above it and loosening up the anhydrite. The outlet tube is then opened.

The following data were determined:

| Product | Outflow time | Air pressure in excess ats. built up inside the chamber | Quantity of air blown through $m^3$ |
|---------|--------------|--------------------------------------------------------|--------------------------------------|
| $A_D$   | 70           | 0.13                                                   | 11.0                                 |
| $A_W$   | 20           | 0.03                                                   | 3.0                                  |
| $B_D$   | 48           | 0.10                                                   | 8.0                                  |
| $B_W$   | 18           | 0.03                                                   | 2.6                                  |

These results also show the uniform character of the products produced according to the invention in addition to their considerably improved fluidity.

It will be appreciated that the instant specification and examples are set forth by way of illustration and not limitation, and that various modifications and changes may be made without departing from the spirit and scope of the present invention.

What is claimed is:

1. In the production of synthetic anhydrite wherein calcium fluoride and sulfuric acid are reacted to form hydrofluoric acid, the hydrofluoric acid is removed leaving a residue comprising synthetic insoluble anhydrite and acid, and recovering synthetic anhydrite from the residue, the improvement which comprises separating the fines from the residue, suspending said fines-free residue in water with vigorous agitation, neutralizing said residue, grinding the suspension, separating water from the suspension to leave synthetic insoluble anhydrite containing about 10 to 50% of water by weight, mixing the residual material with the previously separated fines, and thereafter allowing said mixture to set.

2. The process of claim 1, including the further step of drying the synthetic anhydrite at a temperature of about 50° to 600° C, the time from suspension of the residue in water through drying ranging from about 10 minutes to 24 hours.

3. The process of claim 2, wherein before or during suspension of the residue there is added thereto an activator for accelerating subsequent hydration of the anhydrite in about 0.1 to 5% by weight of the residue.

4. The process of claim 1, wherein neutralization is effected with at least one member selected from the group consisting of calcium oxide, calcium hydroxide, calcium carbonate, sodium hydroxide and potassium hydroxide.

5. The process of claim 1, wherein the separation of water from the suspension is effected in a plurality of stages, the water separated from the first of said stages being used to suspend additional residue.

6. The process of claim 1, wherein neutralization is effected with at least one member selected from the group consisting of calcium oxide, calcium hydroxide and calcium carbonate, before or during suspension of the residue there is added thereto at least one of sodium and potassium sulfate in about 0.3 to 1.5% by weight of the residue as an activator for accelerating subsequent hydration of the anhydrite, the separation of water from the suspension being effected in a plurality of stages, the water separated from the first of said stages being used to suspend additional residue, and thereafter drying the synthetic anhydrite at a temperature of about 100° to 250° C, the time from suspension of the residue in water through drying ranging from about 1 to 3 hours.

7. The process of claim 1, wherein neutralization is effected with at least one member selected from the group consisting of sodium hydroxide and potassium hydroxide in an amount such that at least one of sodium and potassium sulfate is present in about 0.3 to 1.5% by weight of the residue to serve as an activator for accelerating subsequent hydration of the anhydrite, the separation of water from the suspension being effected in a plurality of stages, the water separated from the first of said stages being used to suspend additional residue, and thereafter drying the synthetic anhydrite at a temperature of about 100° to 250° C, the time from suspension of the residue in water through drying ranging from about 1 to 3 hours.

8. The process of claim 1, including the further step of adding to the synthetic anhydrite at least one additive selected from the group consisting of Plaster of Paris, dry anhydrite or gypsum.

9. The process of claim 1, wherein the fines are mixed with the synthetic anhydrite in such amount as to impart to the mixture of a free water content of about 5 to 30%, adding to said mixture gypsum in an amount from about 20 to 70% by weight of anhydrite plus gypsum so that the product after setting contains about 50 to 90% of gypsum by weight.

10. The process of claim 1, wherein the fines are mixed with the synthetic anhydrite after drying in such amount so to impart to the mixture a free water content of about 8 to 15%, and adding to said mixture gypsum in an amount from about 40 to 50% by weight of anhydrite plus gypsum.

* * * * *

UNITED STATES PATENT AND TRADEMARK OFFICE
CERTIFICATE OF CORRECTION

PATENT NO. : 4,016,240
DATED : April 5, 1977
INVENTOR(S) : Friedrich Hinsche, et al.

It is certified that error appears in the above-identified patent and that said Letters Patent are hereby corrected as shown below:

| | |
|---|---|
| Col. 1, line 20 | cancel "operation" and substitute -- operating -- |
| Col. 2, line 54 | cancel "simpler" and substitute -- simple -- |
| Claim 9, line 43 col. 10 | delete "of" first occurrence |
| Claim 10, line 50 col. 10 | cancel "so" and substitute -- as -- |

Signed and Sealed this

Thirteenth Day of September 1977

[SEAL]

Attest:

RUTH C. MASON
Attesting Officer

LUTRELLE F. PARKER
Acting Commissioner of Patents and Trademarks